(12) United States Patent
Jenkins et al.

(10) Patent No.: US 7,252,696 B2
(45) Date of Patent: Aug. 7, 2007

(54) FAN COIL MEDIA CABINET

(75) Inventors: Danny L. Jenkins, Camby, IN (US); Kevin H. Waldo, Greenwood, IN (US); Robert G. Fisher, Pittsboro, IN (US); Dwight H. Heberer, Brownsburg, IN (US)

(73) Assignee: Carrier Corporation, Farmington, CT (US)

( * ) Notice: Subject to any disclaimer, the term of this patent is extended or adjusted under 35 U.S.C. 154(b) by 322 days.

(21) Appl. No.: 10/932,772

(22) Filed: Sep. 2, 2004

(65) Prior Publication Data

US 2006/0042207 A1    Mar. 2, 2006

(51) Int. Cl.
*B01D 46/00* (2006.01)

(52) U.S. Cl. .......................... 55/481; 55/506; 55/490.1

(58) Field of Classification Search .................. 55/490, 55/490.1, 493, 495, 496, 497, 481, 482, 478, 55/502, 511, 506, 509, 521; 96/230
See application file for complete search history.

(56) References Cited

U.S. PATENT DOCUMENTS

| | | | | |
|---|---|---|---|---|
| 3,494,113 A | * | 2/1970 | Kinney | 55/481 |
| 3,740,934 A | * | 6/1973 | Shuler | 55/490 |
| 3,789,589 A | * | 2/1974 | Delany et al. | 55/481 |
| 3,793,813 A | | 2/1974 | McAllister | |
| 4,701,196 A | | 10/1987 | Delany | |
| 5,458,667 A | * | 10/1995 | Poggi et al. | 55/480 |
| 6,264,713 B1 | * | 7/2001 | Lewis, II | 55/481 |
| 6,502,909 B1 | * | 1/2003 | Swilik et al. | 312/263 |
| 6,849,107 B1 | * | 2/2005 | Huffman | 96/224 |

* cited by examiner

*Primary Examiner*—Duane Smith
*Assistant Examiner*—Robert Clemente
(74) *Attorney, Agent, or Firm*—Marjama & Bilinski LLP

(57) ABSTRACT

A fan coil media cabinet for use with a fan coil unit. The cabinet includes an open-sided inner liner having co-joined top, bottom, back, and front panels. The inner panel is mounted within an outer shell having top, bottom, and back walls that are located adjacent to the top, bottom, and back walls of the outer shell. The outer shell contains a ledge that extends about the inner periphery of the shelf upon which the inner liner is seated. The width of the outer shell walls is greater than that of the inner liner panels so that the walls extend outwardly to one side beyond the inner liner. In assembly, the extended wall sections of the outer shell are mounted in contiguous relation with the return inlet of the fan coil and are fastened thereto to create a rigid structure.

13 Claims, 3 Drawing Sheets

FAN COIL MEDIA CABINET

BACKGROUND OF THE INVENTION

This invention relates to a media filter cabinet for installation in a ducted system that has been modified either at the time of installation or sometime thereafter so that the system can provide both heating and cooling.

Currently, dealers and distributors who install or modify existing ducted systems so that the system can provide both heating and cooling find difficulty in installing a filter cabinet into the system because of the presence of the fan coil unit at the entrance to the return air duct. Attempts to alter existing cabinets such as that described in U.S. Pat. No. 6,502,909 to Swilik, Jr. et al., have not proven to be very successful because the existing cabinets are of a different dimension than that required in a ducted system equipped with a fan coil unit. Accordingly, any needed alteration is work intensive, time consuming, and costly. In addition, a relatively large number of fasteners are generally required to properly mount the altered cabinet particularly with regard to the return air duct of the system.

A number of after market cabinet suppliers manufacture cabinets that provide a better fit than the modified cabinets, however, these after market products still require a certain amount of refinement before they fit properly into the system again wasting a good deal of time and effort on the part of the installer.

SUMMARY OF THE INVENTION

It is therefore a primary object of the present invention to improve fan coil media cabinets.

It is a further object of the present invention to more precisely fit a media cabinet filter into a ducted system that is equipped with a fan coil unit.

It is a still further object of the present invention to reduce the time and effort required to install a media filter cabinet in a ducted system that is equipped with a fan coil unit.

Another object of the present invention is to reduce the number of parts and fasteners needed to install a media filter cabinet to a fan coil unit.

These and other objects of the present invention are attained by a media filter cabinet for use in association with the fan coil unit of a ducted system. The cabinet includes a drop in open-sided inner liner containing top and bottom panels that are co-joined by front and back panels. The inner liner is mounted within an outer shell that encompasses the top panel, bottom panel, and back panel of the inner liner whereby air can flow freely through the opposed sides of the assembly. The shell is rigidly mated to the return air opening of the fan coil unit, so that the front panel of the inner liner remains accessible. The front panel contains an access door having an opening through which a media filter can be inserted into or removed from the inner liner. The inner liner rests upon flanges located along one edge of the shell and is secured in place using a minimum number of fasteners. A space is provided between the walls of the shell and the adjacent panels of the inner liner and a fiberglass insulation blanket is mounted within the space. The door to the inner liner is also provided with insulation to further limit the exchange of energy between the interior of the cabinet and the surrounding ambient.

BRIEF DESCRIPTION OF THE DRAWINGS

For a better understanding of these and other objects of the present invention, reference will be made to the following detailed description of the invention, which is to be read in association with the accompanying drawings, wherein.

DETAILED DESCRIPTION OF THE INVENTION

Referring now to FIGS. 1-4, there is illustrated a media filter cabinet, generally referenced 10, that embodies the teachings of the present invention. The cabinet is arranged so that it can be rigidly secured to the return air opening 11 of a fan coil unit. The cabinet is mounted in the return air duct of a ducted system directly to the inlet of a fan coil unit. The cabinet is adapted to slideably receive therein a high efficiency media filter 13. Such high efficiency type air filters are referred to as media filters because they contain a number of different filtering media each of which acts upon the air passing through the filter to remove a wider number of air borne contaminants when compared to earlier single medium filters.

Figure 4:
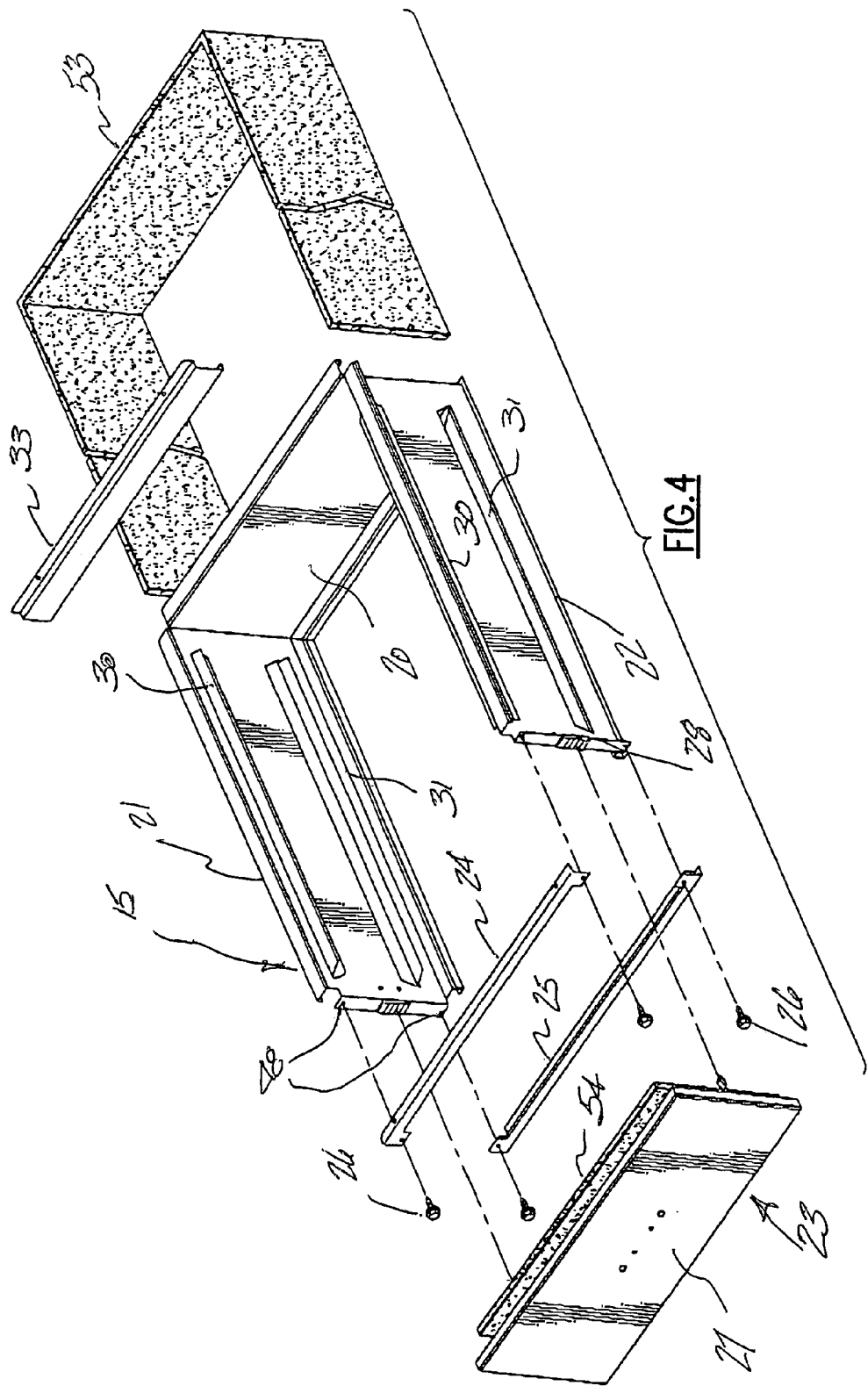
FIG. 4 is an exploded view in perspective showing the inner liner of the cabinet in greater detail.

The present cabinet includes an inner liner 15 that is contained within an outer shell 16. The inner liner, which is shown in greater detail in FIG. 4 is constructed in the manner described in U.S. Pat. No. 6,502,909 to Swilik, Jr. et al., the teachings of which are incorporated herein by reference. The inner liner contains a back panel 20, a top panel 21, a bottom panel 22, and a front panel 23 that contains a pair of spaced apart cross brackets 24 and 25 that define a door opening. The panels are brought together as explained in the Swilik, Jr. et al. patent to form an open-sided rectangular frame. The connecting sheet metal parts utilized in the Swilik, Jr. et al. patent are provided with tabs and cutouts so that tabs of one panel can be mated with a cutout in an adjacent panel and the tabs then bent over to join the parts in assembly. It should be understood, however, other forms of connectors may be also employed without departing from the teachings of the present invention, as for example, self-tapping sheet metal screws or other types suitable threaded fasteners known and used in the art.

Figure 1:
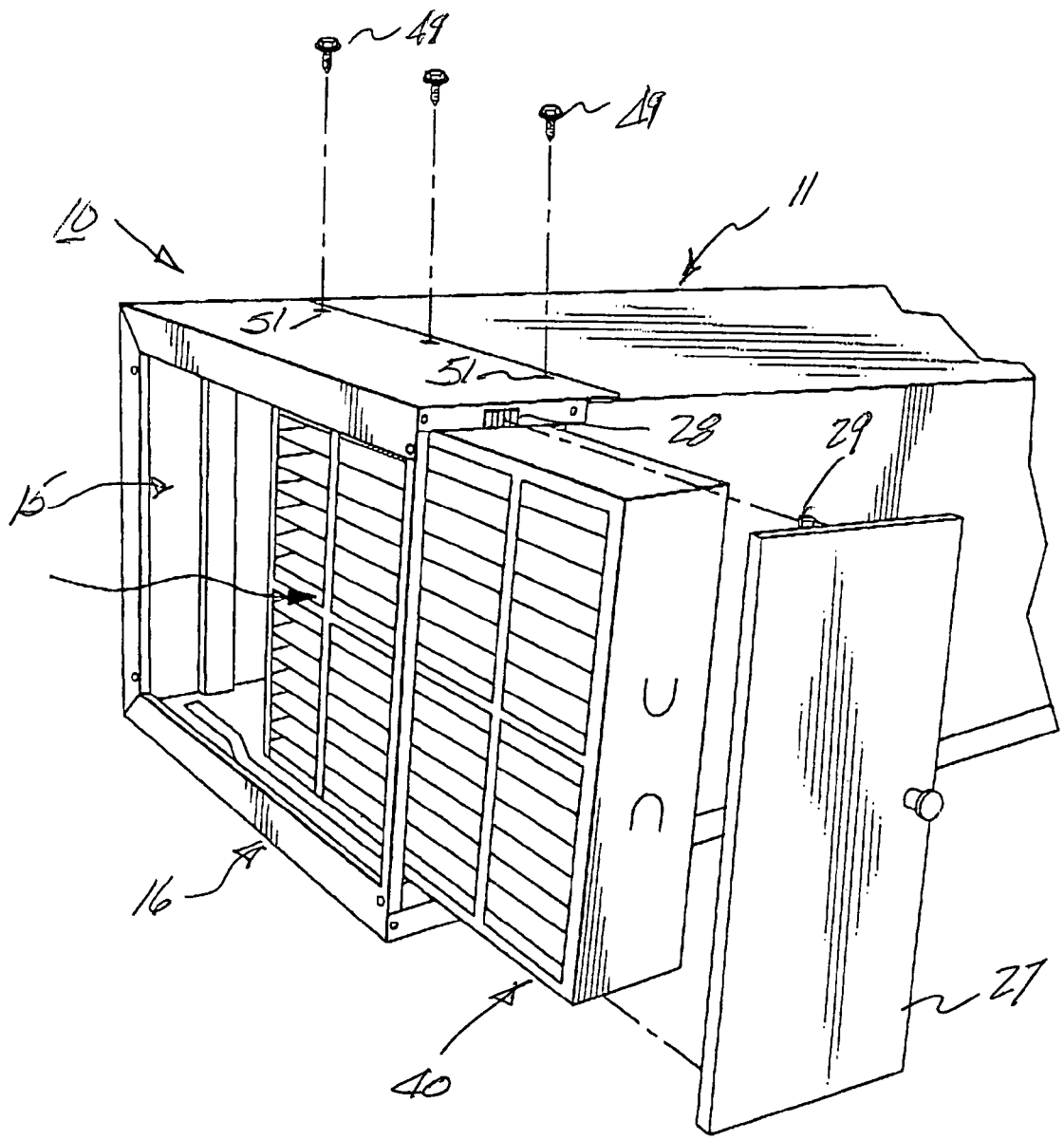
FIG. 1 is a perspective view showing a filter media cabinet attached to the return air opening of a fan coil unit.

The door opening of the inner liner is dimensioned so that media filters having a width up to five inches may be inserted into and removed from the liner through the door opening. As illustrated in FIG. 4, the brackets 24 and 25 are secured to the top and bottom panels of the inner liner using sheet metal screws, 26. A door 27 is removeably secured to the inner liner by means of top and bottom bayonet connectors, which include a female member 28 that is arranged to mate with a male member 29 (FIG. 1). Although bayonet type connectors are shown in FIG. 1, any suitable type of connector for removeably securing the door to the frame may be employed without departing from the teachings of the invention.

A pair of parallel spaced apart guide rails 30 and 31 are integrally formed in the top and bottom panels of the inner liner for directing the media filter into and out of the liner and for properly positioning the media filter within the liner.

A stop rail 33 is also secured upon the back panel of the inner liner which further helps to position the media filter within the inner liner.

As noted above, attempts have been made to modify existing gas furnace media filter cabinets of the type described in the Swilik, Jr. et al. patent for use in association with ducted systems that are equipped with fan coil units. These attempts for the most part have been unsatisfactory for a number of reasons. The Swilik et al. type cabinet is not dimensionally compatible for use in most fan coil applications and must be altered considerably when used within a ducted system equipped with a fan coil. The overall structure of the Swilik et al. cabinet is relatively weak, and as a consequence, a relatively large number of fasteners are required to mount the modified cabinet to system.

Figure 3:
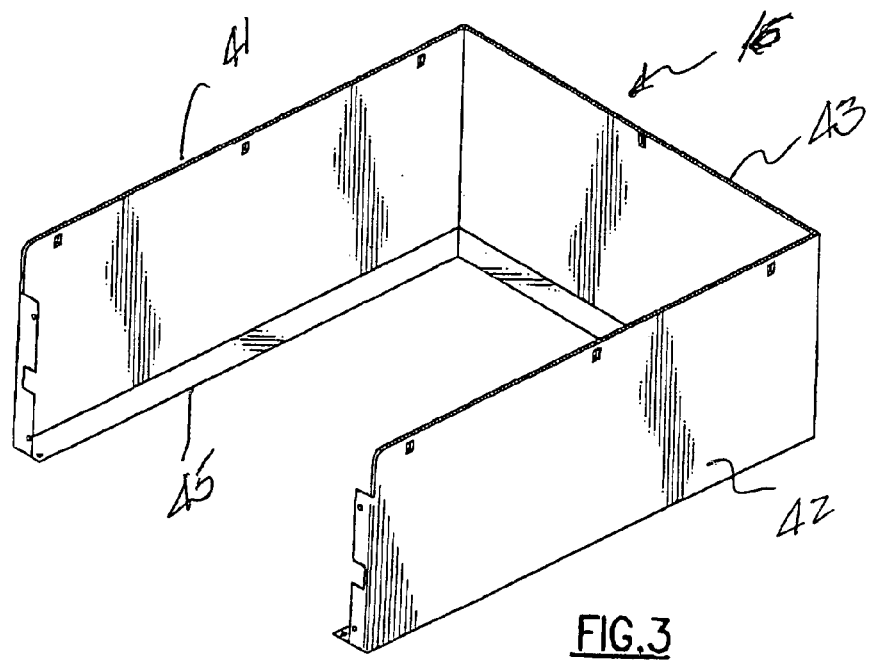
FIG. 3 is a further perspective view showing the outer sleeve of the cabinet in greater detail.

To overcome these and other difficulties, the inner liner of the present cabinet is mounted within a three-sided outer shell generally referenced 16, which is shown in detail in FIG. 3. The shell is relatively simple in construction and is fabricated from a single sheet of sheet metal that is bent to form a top wall 41 and a bottom wall 42 that are co-joined by a back wall 43. The side edges of each wall are bent inwardly perpendicular to the plane of the wall to establish a ledge 45 that extends around the perimeter of the outer shell. In assembly, the inner liner is simply dropped into the sleeve so that the top panel, the bottom panel, and the back panel rest upon the ledge. The inner liner is then joined to the shell using four sheet metal screws 26-26 that pass through the brackets in the front panel of the inner liner and are threaded into receiving holes 48-48 contained in the top and bottom panels of the inner liner. Although not shown, rivets might also be used to join the ledge of the shell to adjacent panels of the inner liner. It has been found that two rivets along with the four above mentioned screws are sufficient to establish a extremely rigid cabinet structure.

Figure 2:
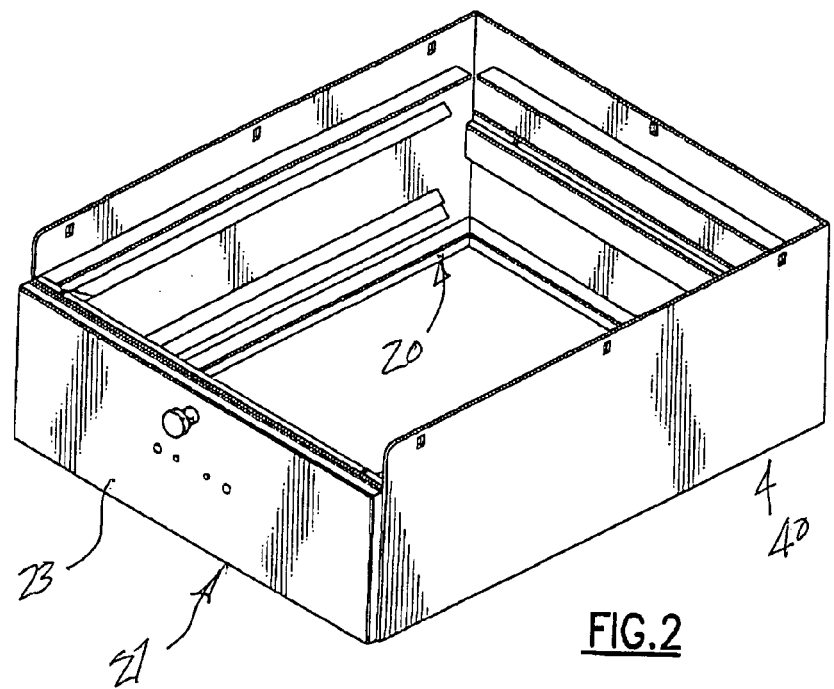
FIG. 2 is a perspective view showing the inner liner of the cabinet assembled within the outer sleeve of the cabinet.

As illustrated in FIG. 2, the walls of the outer shell have a greater width than the width of the adjacent panels and thus protrude to one side of the inner liner when the inner liner is seated upon the ledge of the shell. In assembly, the extended sections of the sleeve wall are arranged to pass over the return duct of the furnace and are secured to the duct walls to sheet metal screws 49-49 (FIG. 1). Screw holes 51 are provided in the extended sections of the shell walls for this purpose. When secured to the return duct, the access door of the cabinet can be freely opened and closed to facilitate replacement of the media filter 40. The fan coil is then mounted adjacent to the open side of the cabinet and is fastened in place using the existing fan coil fastener.

In assembly, a space is provided between the walls of the sleeve and the adjacent panels of the inner liner. This space is filled with an insulating material 53, such as fiberglass or the like to prevent the transfer of energy between the cabinet and the surrounding ambient. Similarly, the door also contains a strip of insulating material 54 to further help prevent the exchange of energy between the cabinet and the surrounding ambient.

While this invention has been particularly shown and described with reference to the preferred embodiment in the drawings, it will be understood by one skilled in the art that various changes in its details may be effected therein without departing from the teachings of the invention.

What is claimed is:

1. A fan coil media filter cabinet interposed between a fan coil unit and the ducted system return air outlet and the fan coil return air inlet, wherein said cabinet includes:
    an inner liner that includes a top panel, a bottom panel, a back panel, and a front panel that contains a door opening, said panels being co-joined to form an open-sided frame;
    a three-sided outer shell having a top wall, a bottom wall, and a back wall that is joined to the inner liner so that the top wall, the bottom wall, and back wall are adjacent to the top panel, the bottom panel, and the back panel of the inner liner to form a space between the adjacent walls and panels;
    an insulating material filling the space between the adjacent walls and panels;
    fastening means for securing the outer shell of the cabinet to the return air duct of a furnace, and
    flanges extending outwardly from the inner liner top, bottom, and back panels, said flanges engaging along their entire length with the inner walls of the respective top bottom and back walls of said outer shell.

2. The cabinet of claim 1 that further includes a door for closing the opening in the front panel of the inner liner.

3. The cabinet of claim 2, wherein said door further includes a layer of insulating material.

4. The cabinet of claim 1, wherein the top panel and the bottom panel of the inner liner contain guide means for positioning a media filter within the inner liner.

5. The cabinet of claim 1, wherein said fastening means include screws.

6. The cabinet of claim 1 that further includes a media filter that is insertable into and removable from said inner liner through said door opening.

7. A fan coil media filter cabinet for use in a ducted system having a fan coil unit interposed between the fan coil return air opening and a return air duct, wherein said cabinet includes:
    an inner liner that includes a top panel, a bottom panel, a back panel, and a front panel having a door opening and a removable door for closing the opening, said panel being co-joined to form an open-sided frame,
    an outer shell containing the inner liner, said shell having a top wall and a bottom wall that are co-joined by a back wall;
    means for connecting the inner liner to the outer shell so that the top, bottom, and back panels of the inner liner are adjacent to the top, bottom, and back walls of the outer shell to form a space between the adjacent walls and panels;
    an insulating material filling the space between adjacent walls and panels; and
    fastening means for securing the outer shell to the return air duct of a furnace, wherein said outer cabinet includes an inwardly directed edge flange that extends around one side edge of said outer shell said inner liner resting in contact with said flange.

8. The cabinet of claim 7, wherein the walls of the outer shell have a greater width than that of the adjacent panels of the inner liner wherein said walls of the outer shell extend outwardly to one side beyond the inner liner whereby the extended section of said walls can be seated in contact with the sides of the fan coil unit at the return air opening and fastened to said sides of the fan coil unit.

9. The cabinet of claim 7, wherein a space is provided between the walls of said outer shell and the adjacent panels of the inner liner and further includes an insulation material filling said space.

10. The cabinet of claim 9, wherein said front panel of the inner liner includes a door removeably mounted thereon, said door further containing a layer of insulating material.

11. The cabinet of claim 7, wherein said inner liner further includes internal guide rails for positioning a media filter inside said inner liner.

12. The cabinet of claim 11, wherein said guide rails are mounted upon the top and bottom panels of the inner liner.

13. A fan coil media filter cabinet for use in a ducted system having a fan coil unit interposed between the fan coil return air opening and a return air duct, wherein said cabinet includes:

an inner liner that includes a top panel, a bottom panel, a back panel, and a front panel having a door opening and a removable door for closing the opening, said panel being co-joined to form an open-sided frame, an outer shell containing the inner liner, said shell having a top wall and a bottom wall that are co-joined by a back wall;

means for connecting the inner liner to the outer shell so that the top, bottom, and back panels of the inner liner are adjacent to the top, bottom, and back walls of the outer shell to form a space between the adjacent walls and panels;

an insulating material filling the space between adjacent walls and panels; and fastening means for securing the outer shell to the return air duct of a furnace, and including flanges extending outwardly from the inner liner top, bottom, and back panels, said flanges engaging along their entire lengths with the inner walls of the respective top bottom and back walls of said outer shell.

* * * * *